United States Patent
French et al.

(10) Patent No.: US 10,422,138 B1
(45) Date of Patent: Sep. 24, 2019

(54) ROOF MEMBRANES WITH REMOVABLE PROTECTIVE SHEETS

(71) Applicant: Carlisle Intangible Company, Syracuse, NY (US)

(72) Inventors: David French, Carlisle, PA (US); Anil Shenoy, Machanicsburg, PA (US); Xuan Zhang, Carlisle, PA (US)

(73) Assignee: Carlisle Intangible, LLC, Scottsdale, AZ (US)

( * ) Notice: Subject to any disclaimer, the term of this patent is extended or adjusted under 35 U.S.C. 154(b) by 0 days.

(21) Appl. No.: 15/973,955

(22) Filed: May 8, 2018

(51) Int. Cl.
| | |
|---|---|
| *E04D 5/12* | (2006.01) |
| *E04D 5/06* | (2006.01) |
| *E04D 5/10* | (2006.01) |
| *B32B 7/06* | (2019.01) |
| *B32B 7/12* | (2006.01) |
| *B32B 27/08* | (2006.01) |

(52) U.S. Cl.
CPC ............. *E04D 5/12* (2013.01); *B32B 7/06* (2013.01); *B32B 7/12* (2013.01); *B32B 27/08* (2013.01); *E04D 5/06* (2013.01); *E04D 5/10* (2013.01); *B32B 2250/02* (2013.01); *B32B 2307/408* (2013.01); *B32B 2307/71* (2013.01); *B32B 2307/732* (2013.01); *B32B 2307/744* (2013.01); *B32B 2419/06* (2013.01)

(58) Field of Classification Search
CPC ....................................................... E04D 5/12
USPC .......................................................... 52/105
See application file for complete search history.

(56) References Cited

U.S. PATENT DOCUMENTS

| | | | | |
|---|---|---|---|---|
| 2,096,784 | A * | 10/1937 | Candler | E04D 5/12 52/553 |
| 2,122,747 | A * | 7/1938 | Kirschbraun | E04D 5/12 52/416 |
| 3,358,355 | A | 12/1967 | Youssi | |
| 3,770,559 | A * | 11/1973 | Jackson | C09J 7/29 428/40.3 |
| 3,937,640 | A * | 2/1976 | Tajima | B32B 37/24 156/71 |
| 4,386,981 | A | 6/1983 | Clapperton | |
| 4,584,220 | A * | 4/1986 | Melbye | B05C 17/06 428/42.3 |
| 4,996,812 | A | 3/1991 | Venable | |
| 5,070,122 | A | 12/1991 | Vanderbilt et al. | |
| 5,135,966 | A | 8/1992 | Chatterjee et al. | |
| 5,142,837 | A * | 9/1992 | Simpson | B32B 15/08 428/141 |

(Continued)

FOREIGN PATENT DOCUMENTS

AR 109040 A1 * 10/2018 ........... B32B 11/046

*Primary Examiner* — Babajide A Demuren
(74) *Attorney, Agent, or Firm* — Wood Herron & Evans LLP (57) ABSTRACT

During installation of a single-ply roofing membrane, the surface of the membrane can be protected from dirt, scratches and scrapes by a protective sheet which also provides other beneficial attributes that aid an installer. A roof laminate includes a roof membrane and a protective sheet is removably affixed thereto. The sheet includes at least a first layer directly secured to a second layer. The first layer provides at least one of UV protection, anti-slip, and anti-glare to the roof laminate and so aids the installer in at least one of those respects. The second layer is removably affixed to the roof membrane.

38 Claims, 5 Drawing Sheets

(56) References Cited

U.S. PATENT DOCUMENTS

| | | | | |
|---|---|---|---|---|
| 5,143,766 A | * | 9/1992 | Wenz | B32B 11/10 428/40.3 |
| 5,456,785 A | | 10/1995 | Venable | |
| 5,620,554 A | | 4/1997 | Venable | |
| 5,643,399 A | | 7/1997 | Venable | |
| 5,667,889 A | * | 9/1997 | Katsura | C08J 7/042 423/352 |
| 5,749,994 A | * | 5/1998 | Sundet | B32B 17/10247 156/230 |
| 6,296,912 B1 | | 10/2001 | Zickell | |
| 6,426,129 B1 | * | 7/2002 | Kalwara | E04D 5/12 428/41.8 |
| 6,502,360 B2 | | 1/2003 | Carr, III et al. | |
| 6,769,215 B1 | * | 8/2004 | Carkner | E04D 5/12 156/71 |
| 7,044,411 B2 | * | 5/2006 | Knowlton | B32B 3/14 242/160.1 |
| 7,291,358 B1 | * | 11/2007 | Fensel | B32B 37/24 427/186 |
| 8,105,965 B2 | * | 1/2012 | Zhang | B32B 11/04 442/327 |
| 8,709,565 B2 | * | 4/2014 | Kalwara | E04D 5/12 428/354 |
| 8,833,037 B2 | * | 9/2014 | French | E04D 5/10 52/746.11 |
| 9,163,410 B2 | | 10/2015 | French et al. | |
| 2003/0054127 A1 | * | 3/2003 | Heifetz | B29C 63/0017 428/40.1 |
| 2004/0081789 A1 | * | 4/2004 | Kim | B32B 9/00 428/40.3 |
| 2006/0243388 A1 | * | 11/2006 | Kubiak | B32B 11/06 156/324 |
| 2007/0054129 A1 | | 3/2007 | Kalkanoglu et al. | |
| 2009/0320383 A1 | * | 12/2009 | Taylor | E04D 5/149 52/90.1 |
| 2010/0024955 A1 | * | 2/2010 | Kalwara | E04D 5/12 156/71 |
| 2010/0218876 A1 | * | 9/2010 | Mellott, II | B32B 11/10 156/60 |
| 2013/0263552 A1 | * | 10/2013 | French | E04D 5/10 52/745.06 |
| 2013/0295295 A1 | * | 11/2013 | Douglas | E04D 5/12 427/508 |
| 2014/0115980 A1 | * | 5/2014 | Edwards | E04D 13/152 52/173.3 |
| 2014/0345230 A1 | * | 11/2014 | French | E04D 5/10 52/746.11 |
| 2015/0361669 A1 | * | 12/2015 | Barksdale | B32B 27/08 52/746.11 |
| 2016/0243793 A1 | | 8/2016 | Binkley | |
| 2016/0258164 A1 | * | 9/2016 | Canales | E04D 5/00 |
| 2016/0325539 A1 | * | 11/2016 | Murillo-Maese | B32B 3/02 |
| 2016/0354993 A1 | * | 12/2016 | Grube | B32B 5/02 |
| 2017/0328067 A1 | * | 11/2017 | Granovsky | E04D 5/06 |
| 2019/0032337 A1 | * | 1/2019 | Sipag | E04D 5/10 |

\* cited by examiner

ROOF MEMBRANES WITH REMOVABLE PROTECTIVE SHEETS

CROSS-REFERENCE TO RELATED APPLICATIONS

This application is related to U.S. Pat. No. 8,833,037, filed Apr. 5, 2012, and to U.S. Pat. No. 9,163,410 filed Jul. 20, 2014, each of which is incorporated by reference herein in its entirety.

BACKGROUND

Membrane roofs are roofs that are covered with a polymeric sheet or membrane. These polymeric sheets can be, for example, polyvinyl chloride (PVC), thermoplastic olefin (TPO), or ethylene propylene diene monomer rubber (EPDM), as well as other materials. The polymeric sheet is positioned over a roof surface and held in place by fasteners, adhesive, or ballast. Adjacent sheets are bonded together along lap seams to form a unitary single sheet of the polymer covering the entire roof.

Generally, roof membranes are either white or black. Theoretically, the membranes could be basically any color. The choice of color may be for aesthetic purposes or to reduce energy costs by reflecting thermal energy. Regardless of color, the appearance following installation is of paramount importance both from an aesthetic standpoint and from a functional standpoint.

When replacing an existing roof, new sheeting is difficult to keep clean. In a re-roofing application, a section of the old roof covering is removed and new roof membrane is immediately installed in its place. This allows the roof to be fully covered each night. As subsequent sections of the old roof are removed, the roofers walk on the newly installed membrane. This can scratch and mar the new membrane.

While these membranes have generally been commercially successful, there remains a need for additional improvements to facilitate their installation.

SUMMARY

Embodiments of the present invention are premised on the realization that during installation of a single-ply roofing membrane, the surface of the membrane can be protected from dirt, scratches and scrapes by a protective sheet which also provides other beneficial attributes that aid an installer. To those and other ends, a roof laminate to be secured to a roof deck includes a roof membrane that has a first surface and a second surface and is configured to be secured to the roof deck. A protective sheet is removably affixed to the first surface and includes at least a first layer directly secured to a second layer. The first layer provides at least one of UV protection, anti-slip characteristics, and anti-glare characteristics to the roof laminate and so aids the installer in at least one of those respects. The second layer is removably affixed to the roof membrane.

In one embodiment, the first layer is configured to provide anti-slip characteristics and includes a pattern of raised areas spaced apart by recessed areas.

In one embodiment, the first layer is configured to provide anti-slip characteristics with a static, dry coefficient of friction greater than 0.45 and a static wet coefficient of friction greater than 0.6.

In one embodiment, the first layer is configured to provide anti-glare characteristics and includes a coating that produces less than 30 gloss units at 60°.

In one embodiment, the first layer is configured to provide UV protection and includes at least one of an antioxidant, a light stabilizer additive, and a light reflective pigment.

In one embodiment, one of the first layer and the second layer is colored and the other of the first layer and the second layer is configured to provide UV protection and includes at least one of an antioxidant, a light stabilizer additive, and a light reflective pigment.

In one embodiment, one of the first layer and the second layer includes text or other indicia.

In one embodiment, the protective sheet is affixed to the roof membrane by a layer of water insoluble adhesive.

In one embodiment, the layer of water insoluble adhesive has a preferential adherence to the second layer as compared to the roof membrane so that as the protective sheet is removed from the roof membrane, the adhesive is removed from the roof membrane by the protective sheet.

In one embodiment, the roof membrane is formed of at least one of PVC, TPO, EPDM, and polyolefin.

In one embodiment, the roof membrane is formed from a polymer selected from the group consisting of at least one of PVC, TPO, and EPDM.

In one embodiment, the roof membrane has a thickness of 40-160 mils.

In one embodiment, the protective sheet includes first and second perforations along first and second edges of the protective sheet.

In one embodiment, the protective sheet does not cover first and second edge portions of the roof membrane.

In one embodiment, the protective sheet sticks to the roof membrane in the absence of a separate adhesive.

According to one aspect of the present invention, a roof laminate to be secured to a roof deck includes a roof membrane that has a first surface and a second surface and is formed from a polymer selected from the group consisting of at least one of PVC, TPO, and EPDM with a thickness of 40-160 mils. The roof membrane is to be secured to the roof deck. A protective sheet is removably affixed to the roof membrane and includes at least a first layer directly secured to a second layer. The first layer is configured to provide at least one of UV protection, anti-slip characteristics, and anti-glare characteristics to the roof laminate and so aid the installer in at least one of those respects. A layer of adhesive is disposed between the first surface and the second layer. The adhesive is configured to adhere to the second layer when the protective sheet is removed from the roof membrane.

The objects and advantages of embodiments of the present invention will be further appreciated in light of the following detailed description and drawings in which:

DETAILED DESCRIPTION

Figure 1:
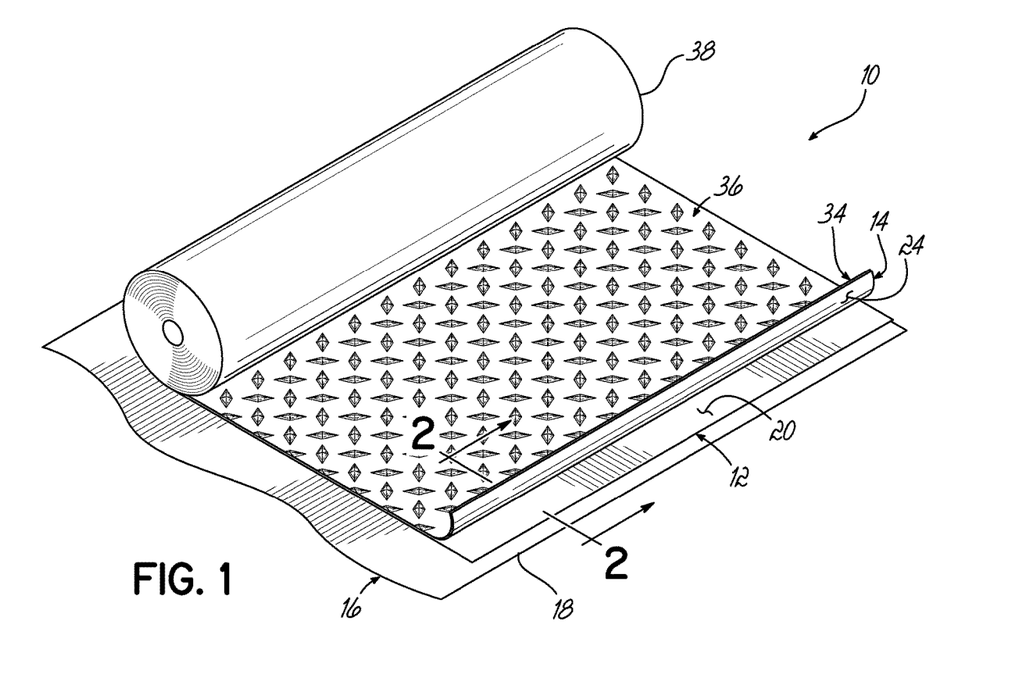
FIG. 1 is a perspective view of one embodiment of the present invention.

To these and other ends and with reference to FIG. 1, a roof laminate 10 includes a single ply roof membrane 12 and a release sheet or protective sheet 14. The roof laminate 10 is to be installed onto a roof, such as a roof deck 16. In that regard, multiple roof laminates 10 may be positioned in an overlapping relationship (shown in FIG. 6 and described below) during installation of a new roof on the roof deck 16. The roof membrane 12 includes a first surface 18 and a second surface 20. The first surface 18 faces the roof deck 16 and may contact it during installation, and the second surface 20 is intended to be exposed to weather following installation. The protective sheet 14 includes a first surface 22 and a second surface 24, which rests on and covers the second surface 20 of roof membrane 12. The protective sheet 14 may be affixed directly to the roof membrane 12 or be separated from the roof membrane 12 by an adhesive, described below. The protective sheet 14 is intended to be removed following installation of a new roof and thus protects the second surface 20 of the roof membrane 12 during installation of the new roof. Removing the protective sheet 14 exposes the second surface 20 of the roof membrane 12. The protective sheet 14 is formed with multiple layers, each layer providing at least one beneficial characteristic designed to aid an installer and is described in detail below.

The roof membrane 12 can be formed from any polymer typically used in roofing applications. These include, by way of example only, polyvinyl chloride (PVC), thermoplastic olefin (TPO), ethylene propylene diene monomer (EPDM), rubbers, polyethylene (PE), polypropylene (PP), as well as other polyolefins. The roof membrane 12 can have a bottom fibrous surface referred to as fleeceback, which improves bond strength in a fully adhered system. The roof membrane 12 is preferably white or slightly off-white, though it can be any color. Embodiments of the present invention are most useful when the membrane 12 is a lighter color, such as white or off-white.

The roof membrane 12 is generally rectangular and can be manufactured to a variety of sizes. By way of example only, the roof membrane 12 can be as narrow as 5 feet to as wide as 40 feet. Length can be from 50 feet to 100 feet or more. The roof membrane 12 has a thickness effective for use as a roof cover, for example, from 20 mills to 160 mils thick, and by way of additional example from 40 mils to 160 mils thick. The roof membrane 12 is water insoluble and designed to withstand natural environmental conditions for prolonged periods of time, for example at least 15 years.

The multiple layers of the protective sheet 14 are polymeric sheets that can be formed from a variety of different polymers. One or all of the layers may be formed from a non-environmentally degradable polymer. These materials may include any one of the materials listed above for the roof membrane 12 and also include polyethylene (including low density polyethylene and linear low density polyethylene), polypropylene, polyamide (i.e., nylon), polyester, polyacrylate, polymethacrylate, polyvinylchloride, polyvinylidene chloride, and combinations thereof.

Figure 2:
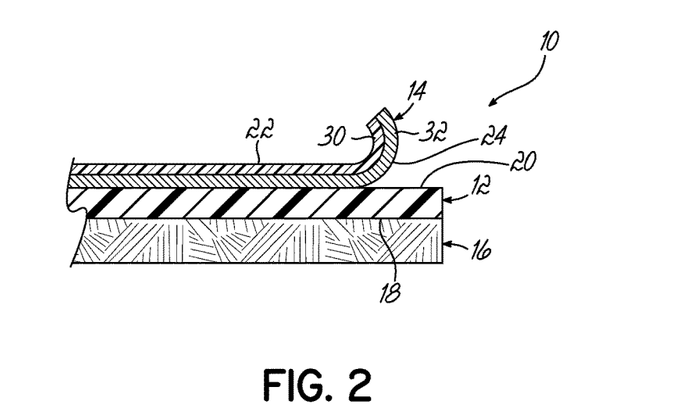
FIG. 2 is a cross-sectional view taken along section line 2-2 of FIG. 1.

In one embodiment, and with reference to FIG. 2, the protective sheet 14 may include layers 30, 32, which may appear as separate films or coatings that are stacked upon one another. For example, in FIG. 2, the protective sheet 14 consists of two layers 30, 32 that are bonded together. Each layer 30, 32 may provide the laminate 10 with a different characteristic designed to aid the installer. Although not shown, layer 32 may be stacked on layer 30 and so form the surface 22 of the protective sheet 14. That is, the order of the layers 30, 32 may be altered depending on the desired attribute of the surface 22. Once the installation is complete, the layers 30, 32 are removed.

In one embodiment, the layer 30 may provide color to the protective sheet 14. Although the protective sheet 14 can be clear, it is preferable that it be tinted with a color that is distinguishable from the color of the roof membrane 12. For example, if the roof membrane 12 is white, the protective sheet 14 is preferably any color other than clear or white, such as green, red, blue or yellow. A pigment or dye may be added to the layer 30 and/or 32 during its manufacture to provide the color for the protective sheet 14. In addition, and with reference to FIG. 6, by way of example, the color may vary across the width of the layer 30. For example, the layer 30 may include at least two different colors. The color in the layer 30 may be utilized to produce text or other indicia or information in the protective sheet 14. As shown, the protective sheet 14 may include advertising information but may also include instructions, warranty information, and other text/symbols.

With continued reference to FIG. 2, the other layer 32 of the layers 30 and 32 may provide UV protection for the protective sheet 14, and for the roof laminate 10 prior to removal of the protective sheet 14. This may be achieved for a short-term weather resistance, for example, a duration of 1 day to 2 years or until the sheet 14 is removed after installation. UV protection may be obtained by the addition of one or more antioxidants, UV absorber and light stabilizer additives, and light effective pigments to the layer 32. By way of example only, antioxidants may include hindered phenols, thiosynergists, hydroxylamines, phosphates, and alpha-tocopherol. Commercially available antioxidants include Irganox® and Irgafos® from BASF; Anox®, Lowinox® and Weston® from Addivant; Songnox® from Songwon; Evernox® and Everfos® from Everspring; BNX® from Mayzo; Thanox® from Rianlon. In addition, or as an alternative, UV protection may be achieved by addition of UV absorbers and light stabilizers, which may include, for example, benzotriazole, hydroxybenzoate, benzophenone, triazine, and hindered amines of various molecular weights. These additives are commercially available from BASF under the brand names Tinuvin® and Chimassorb® and from Solvay under the brand name Cyasorb®, from Sabo under the brand name SaboSTAB®, from Songwon under the brand name of Songsorb®, from Mayzo under the brand name of BLS®, from Everspring under the brand name of EverSTAB®, from Rianlon under the brand of Thasorb®, and from Addivant under the brand of Lowilite. In addition, light reflective pigments can be used to screen UV light, which may include, for example, titanium dioxide. These pigments are commercially available as Ti-Pure® from Chemours, as Kronos® TiO2 from Kronos, as Tiona® from Cristal, as Troxide® from Huntsman, and as Tronox® TiO2 from Tronox.

Figure 3:
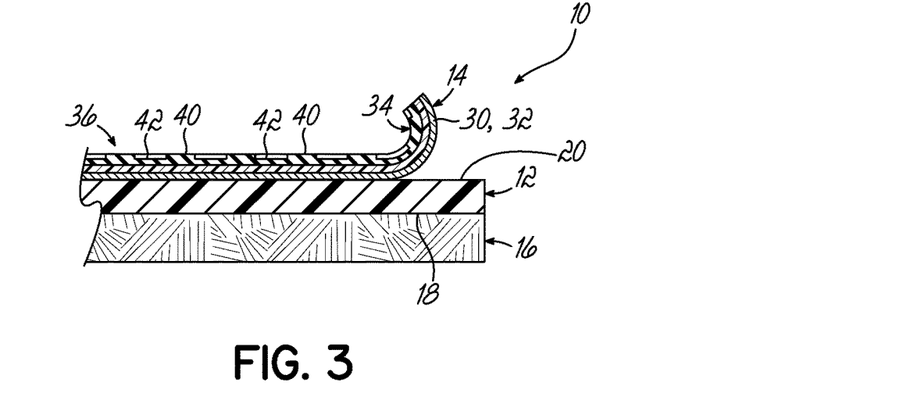
FIGS. 3-5 are cross-sectional views similar to FIG. 2 depicting embodiments of the invention.

In one embodiment and with reference to FIG. 3, the protective sheet 14 may include one or both of the layers 30, 32 described above in FIG. 2. The protective sheet 14 may further include anti-slip layer 34 that is intended to be exposed during installation of the laminate 10 on the roof deck 16. The anti-slip layer 34 is designed to improve traction, particularly with foot traffic. By way of example only, a static, dry coefficient of friction may be greater than 0.45 and a static wet coefficient of friction may be greater than 0.6. The coefficient of friction measurements may be completed according to the ASTM D1894-14 Standard Test Method for Static and Kinetic Coefficients Of Friction Of Plastic Film and Sheeting.

With reference to FIGS. 1 and 3, the anti-slip layer 34 may be formed in a pattern 36 in or on the protective sheet 14, such as a diamond tread illustrated in FIG. 1. In FIG. 3, the pattern 36 may include raised areas 40 separated by recessed areas 42. This localized relative thickness difference in the anti-slip layer 34 produces a physical texturing on the surface 22 of the protective sheet 14. In addition, or as an alternative, the anti-slip layer 34 may include or be formed entirely by rubbery or tacky polymers, such as block copolymers (e.g., SIS and SBS), amorphous poly-alpha olefin, vinyl acetate/ethylene (VAE) and ethylene-vinyl acetate (EVA). These materials may be formed in a uniform coating on the layer 30 or 32 as the anti-slip layer 34 or they may be formed in discontinuous patterns, such as the raised and depressed areas 40, 42 in the pattern 36 on the layer 30.

Figure 4:
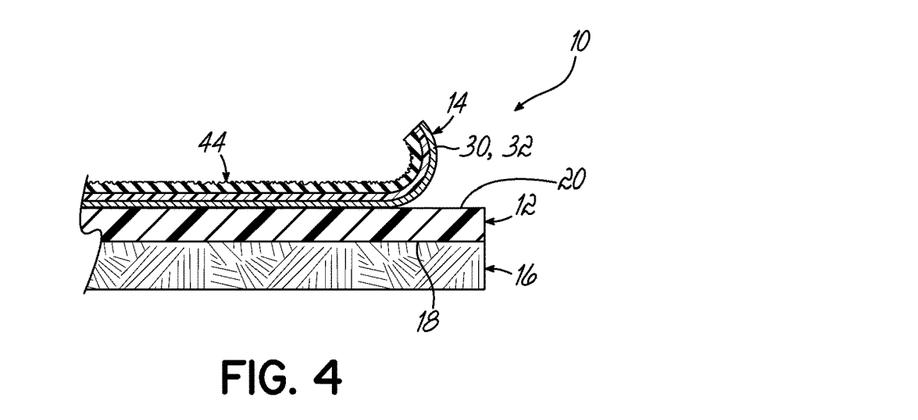
Figure 8:
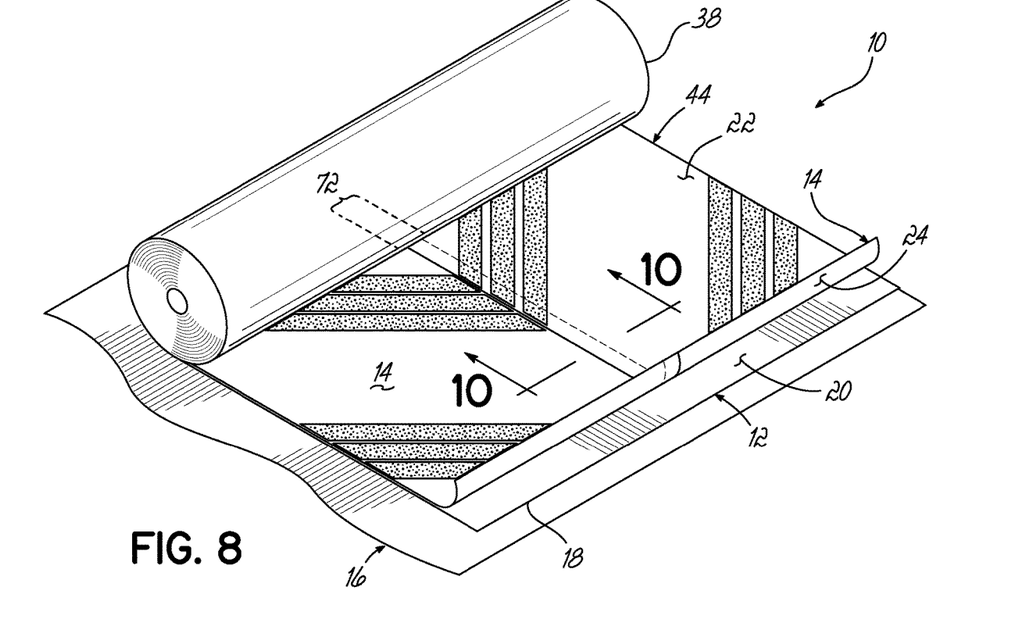
FIG. 8 is a perspective view of one embodiment of the present invention.

With reference to FIG. 4, in one embodiment of the invention, the protective sheet 14 may include one or both of the layers 30 and 32 described above with regard to FIG. 2 with an anti-glare layer 44 forming the surface 22. However, rather than a three-layer protective sheet 14, as shown, the protective sheet 14 may include one of layers 30, 32 and the anti-glare layer 44. The anti-glare layer 44 is designed to reduce reflection of light at any angle of observation that initially impinges on the surface 22. In this way, the installation crew is not exposed to light reflection from the protective sheet 14. The anti-glare layer 44 may be achieved by increasing surface roughness of the layer 30. Alternatively, the anti-glare layer 44 may be produced by a separate coating on the layer 30, which may be formed by low crystallinity polymers, such as amorphous poly-alpha olefin, vinyl acetate/ethylene (VAE) and ethylene-vinyl acetate (EVA), acrylic, or silicone. As shown in FIG. 8, the anti-glare layer 44 may include anti-glare regions in a pattern on the surface 22. The anti-glare layer 44 may have an intermediate gloss of less than 20 gloss units (GU) when measured at 60° in accordance with the ASTM D2457-13 Standard Test Method for Specular Gloss of Plastic Films and Solid Plastics. In one embodiment, the layer 34 or layer 44 may have both anti-slip and anti-glare characteristics in the above-identified ranges.

With reference to FIGS. 2-4, the protective sheet including one or more of the layers 30, 32, 34, and 44 may be made by co-extrusion, co-blowing, or a lamination process.

Figure 5:
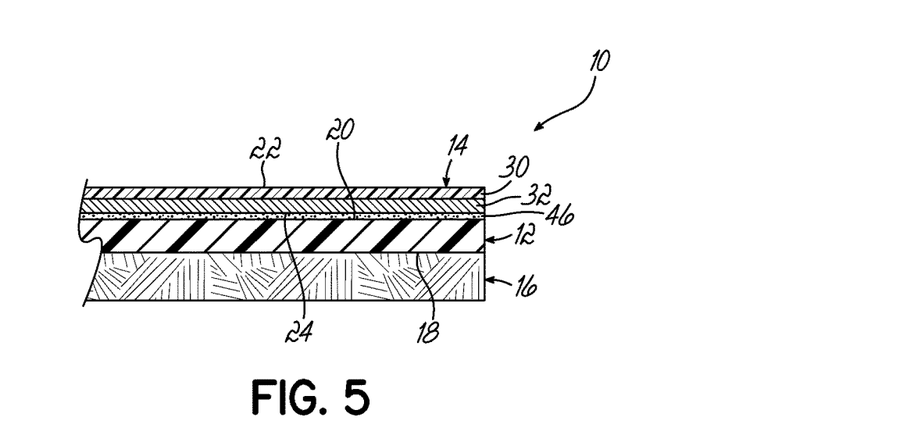

As shown in FIG. 5, a thin layer of a water-insoluble adhesive 46 may be applied between the second surface 20 of the roof membrane 12 and the surface 24 of the protective sheet 14 to adhere the two together. The adhesive 46 may be clear and have a preferable adherence to the protective sheet 14 as opposed to the roof membrane 12. In this way, when the protective sheet 14 is removed, the adhesive 46 is also removed. The surface 20 is thus left dirt and adhesive free. Water insoluble adhesives may include acrylic based, natural rubber-based, butyl rubber-based, styrenic block copolymer based, ethylene-vinyl acetate based, amorphous poly-alpha olefin based and silicone based adhesives.

The roof laminate 10 is formed by separately forming the roof membrane 12 and the protective sheet 14, and laminating the two together. If the laminate 10 includes the adhesive 46, the adhesive 46 can be formed by co-extruding a pressure sensitive adhesive along with the membrane 12, or subsequently coating the membrane 12 with a pressure sensitive adhesive, in particular a thermoplastic pressure sensitive adhesive. In one embodiment, the laminate 10 is adhesive free (FIG. 2). In that regard, the protective sheet 14 can also be made naturally adherent to the membrane 12 by incorporating tackifiers into the protective sheet 14, such as into layer 30 or 32, and applying the protective sheet 14 to the membrane 12 in a slightly stretched condition which liberates tackifier. The exposed tackifier provides weak adhesion of the protective sheet 14 to the membrane 12. Once the protective sheet 14 is laminated to the membrane 12, the roof laminate 10 is formed into a roll 38.

Figure 6:
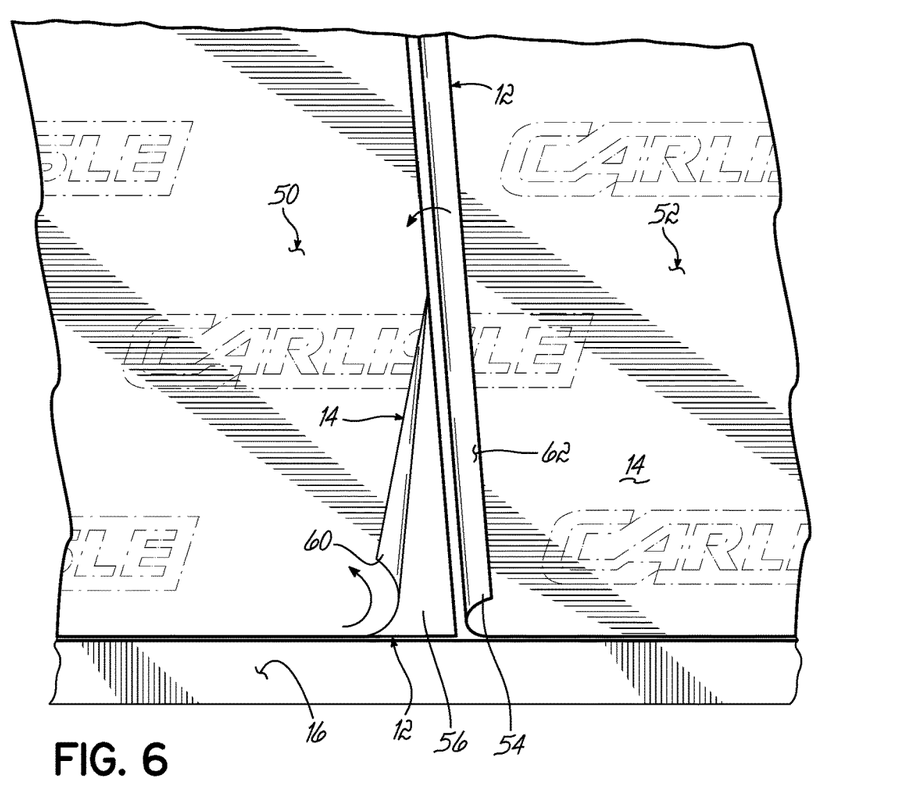
FIG. 6 is a perspective view of one embodiment of the present invention during installation.
Figure 7:
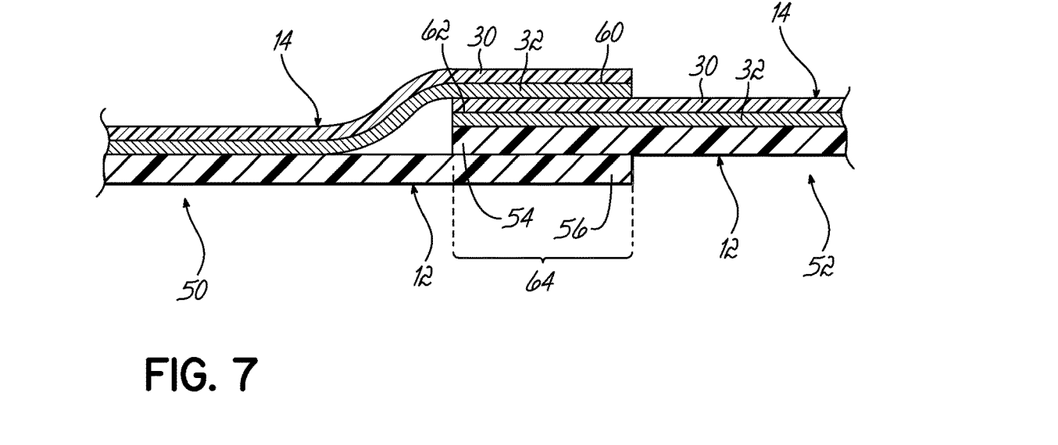
FIG. 7 is a cross-sectional view of an edge portion of the embodiment shown in FIG. 6 prior to removal of a protective sheet.

To apply the roof membrane 12 over the roof deck 16 and with reference to FIGS. 6 and 7, two adjacent roof laminates 50 and 52 are laid down side by side over the roof deck 16. The roof membrane 12 of first laminate 50 is fixed to the roof deck 16, generally using adhesives (not shown) or fasteners (not shown). The second roof laminate 52 is rolled out and adhered to the roof deck 16 adjacent the first laminate 50 with an edge 54 of the second laminate 52 overlapping an edge 56 of the first laminate 50. The overlapping edges 54 and 56 are adhered or welded to each other.

With the embodiment shown in FIGS. 6 and 7, an edge portion 60 of the protective sheet 14 on the first roof laminate 50 is pulled up enough to allow an edge 62 of the second protective sheet 14 to overlap the exposed edge 56 of the first laminate 50. The overlapping edges 54 and 56 are then bonded together by heat or adhesive. As shown in FIG. 7, the edge portion 60 of the protective sheet 14 from the first roof laminate 50 is then folded back and rests over an overlapped portion 64 of the two membranes 12.

Figure 9:
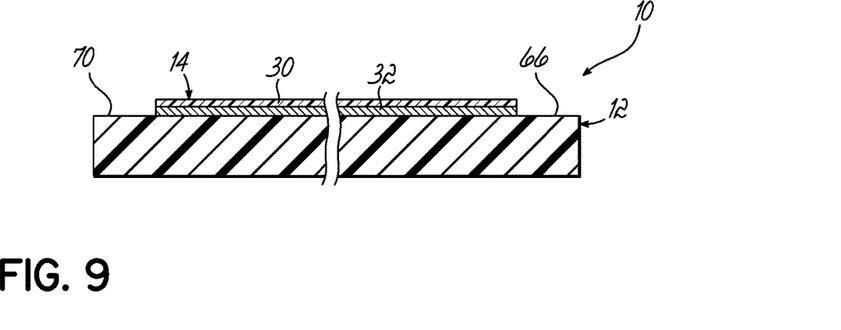
FIG. 9 is a cross-sectional view of one embodiment of the invention.
Figure 10:
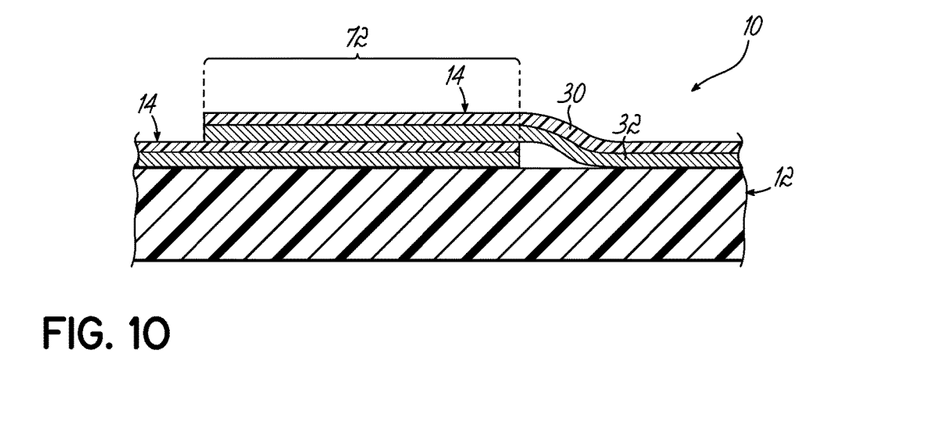
FIG. 10 is a cross-sectional view of one embodiment of the present invention.

As shown in FIG. 1, the protective sheet 14 covers the entire roof membrane 12 from edge to edge. However, as shown in FIG. 9, the protective sheet 14 may cover the entire membrane except for 4- to 12-inch portions on either edges 66 and 70 of the roof laminate 10. Alternatively, as shown in FIGS. 1 and 10, the protective sheet 14 can include an overlap region 72 at which two separate protective sheets 14 may be bonded together.

Figure 11:
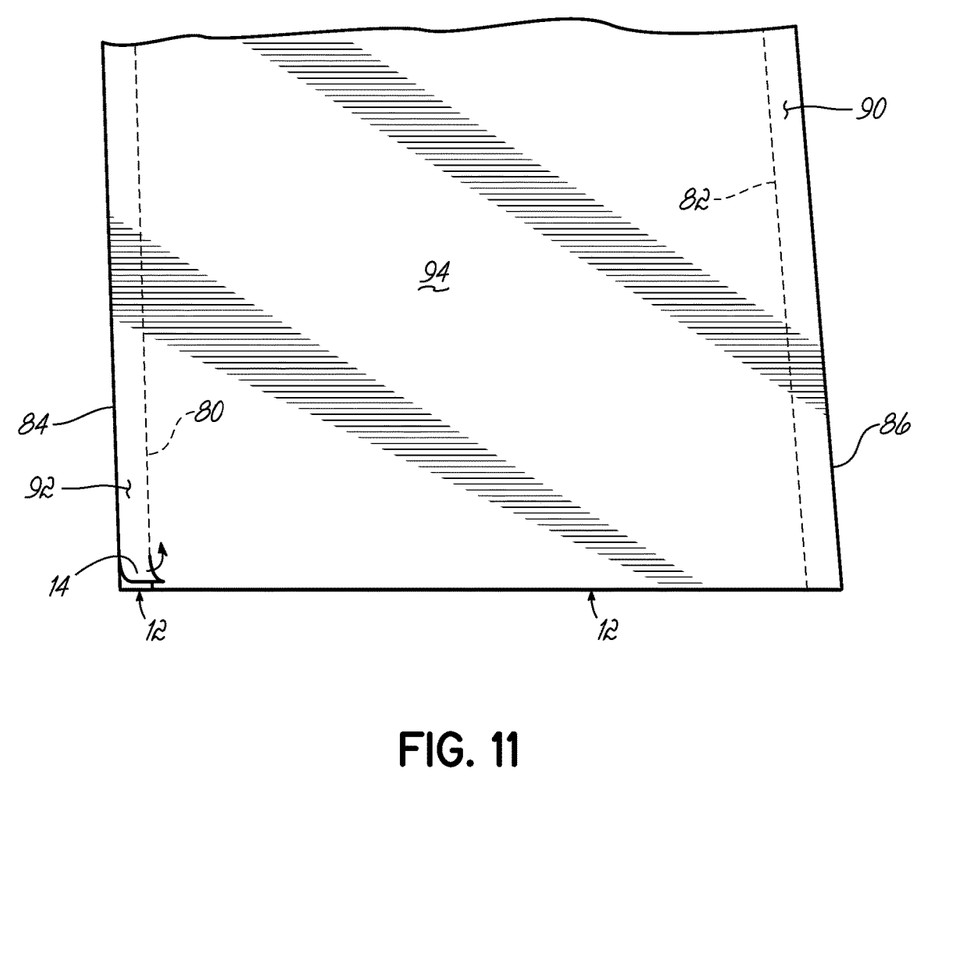
FIG. 11 is a perspective view of one embodiment of the present invention.

In FIG. 11, perforations 80, 82 may be formed alongside edges 84 and 86. The perforations 80, 82 allow strips 90 and 92 to be removed from the protective sheet 14 leaving the field portion 94 of the protective sheet 14 protecting the membrane 12. These embodiments allow adjacent roof laminates 10, and in particular the adjacent membranes 12, to be bonded together while the field portion 94, shown in FIG. 11, remains on the membrane 12.

Once the roof is fully installed, all of the protective sheets 14 are pulled away from the membrane 12 leaving an exposed white or colored membrane surface free of scratches and dirt.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:
1. A roof laminate to be secured to a roof deck comprising:
 a roof membrane that has a first surface and a second surface and is configured to be secured to the roof deck; and a protective sheet that is removably affixed to the first surface and includes at least a first layer directly secured to a second layer, the first layer being configured to provide at least one of UV protection, an anti-slip characteristic, and an anti-glare characteristic to the roof laminate and the second layer being removably affixed to the roof membrane.

2. The roof laminate of claim 1 wherein the first layer is configured to provide the anti-slip characteristic and includes a pattern of raised areas spaced apart by recessed areas.

3. The roof laminate of claim 1 wherein the first layer is configured to provide the anti-slip characteristic with a static, dry coefficient of friction greater than 0.45 and a static wet coefficient of friction greater than 0.6.

4. The roof laminate of claim 1 wherein the first layer is configured to provide anti-glare characteristic and includes a coating that produces less than 30 gloss units at 60°.

5. The roof laminate of claim 1 wherein the first layer is configured to provide UV protection and includes at least one of an antioxidant, a light stabilizer additive, and a light reflective pigment.

6. The roof laminate of claim 1 wherein one of the first layer and the second layer is colored and the other of the first layer and the second layer is configured to provide UV protection and includes at least one of an antioxidant, a light stabilizer additive, and a light reflective pigment.

7. The roof laminate of claim 1 wherein one of the first layer and the second layer includes text or other indicia.

8. The roof laminate of claim 1 wherein the protective sheet is affixed to the roof membrane by a layer of water insoluble adhesive.

9. The roof laminate of claim 8 wherein the layer of water insoluble adhesive has a preferential adherence to the second layer as compared to the roof membrane so that as the protective sheet is removed from the roof membrane, the adhesive is removed from the roof membrane by the protective sheet.

10. The roof laminate of claim 1 wherein the roof membrane is formed of at least one of PVC, TPO, EPDM, and polyolefin.

11. The roof laminate of claim 1 wherein the roof membrane is formed from a polymer selected from the group consisting of at least one of PVC, TPO, and EPDM.

12. The roof laminate of claim 11 wherein the roof membrane has a thickness of 40-160 mils.

13. The roof laminate of claim 1 wherein the protective sheet includes first and second perforations along first and second edges of the protective sheet.

14. The roof laminate of claim 1 wherein the protective sheet does not cover first and second edge portions of the roof membrane.

15. The roof laminate of claim 1 wherein the protective sheet sticks to the roof membrane in the absence of a separate adhesive.

16. A roof laminate to be secured to a roof deck comprising:
a roof membrane that has a first surface and a second surface and is formed from a polymer selected from the group consisting of at least one of PVC, TPO, and EPDM with a thickness of 40-160 mils, the roof membrane to be secured to the roof deck;
a protective sheet that is removably affixed to the roof membrane and includes at least a first layer directly secured to a second layer, the first layer being configured to provide at least one of UV protection, an anti-slip characteristic, and an anti-glare characteristic to the roof laminate; and
a layer of adhesive between the first surface and the second layer, wherein the adhesive is configured to adhere to the second layer when the protective sheet is removed from the roof membrane.

17. The roof laminate of claim 16 wherein the first layer is configured to provide the anti-slip characteristic and includes a pattern of raised areas spaced apart by recessed areas.

18. The roof laminate of claim 16 wherein the first layer is configured to provide the anti-slip characteristic with a static, dry coefficient of friction greater than 0.45 and a static wet coefficient of friction greater than 0.6.

19. The roof laminate of claim 16 wherein the first layer is configured to provide the anti-glare characteristic and includes a coating that produces less than 30 gloss units at 60°.

20. The roof laminate of claim 16 wherein the first layer is configured to provide UV protection and includes at least one of an antioxidant, a light stabilizer additive, and a light reflective pigment.

21. The roof laminate of claim 16 wherein one of the first layer and the second layer is colored and the other of the first layer and the second layer is configured to provide UV protection and includes at least one of an antioxidant, a light stabilizer additive, and a light reflective pigment.

22. The roof laminate of claim 16 wherein one of the first layer and the second layer includes text or other indicia.

23. The roof laminate of claim 1 wherein the first layer is configured to provide the anti-slip characteristic and the anti-glare characteristic.

24. The roof laminate of claim 23 wherein the anti-glare characteristic is in a pattern at a surface of the first layer.

25. The roof laminate of claim 23 wherein the anti-glare characteristic is provided by a low crystallinity polymer.

26. The roof laminate of claim 23 wherein the anti-glare characteristic is provided by an amorphous poly-alpha olefin, a vinyl acetate/ethylene, ethylene-vinyl acetate, acrylic, or silicone.

27. The roof laminate of claim 23 wherein the anti-slip characteristic is provided by one or more of a block copolymer, an amorphous poly-alpha olefin, a vinyl acetate/ethylene, and an ethylene-vinyl acetate (EVA).

28. The roof laminate of claim 2 wherein the raised areas and recessed areas produce thickness differences in the first layer, the raised areas being relatively thicker than the recessed areas.

29. The roof laminate of claim 1 wherein the first layer is configured to provide UV protection and the anti-glare characteristic to the roof laminate.

30. The roof laminate of claim 29 wherein UV protection is provided by one or more of a hindered phenol, a thiosynergist, a hydroxylamine, a phosphate, an alpha-tocopherol benzotriazole, a hydroxybenzoate, a benzophenone, a triazine, and a hindered amine.

31. The roof laminate of claim 16 wherein the first layer is configured to provide the anti-slip characteristic and the anti-glare characteristic.

32. The roof laminate of claim 31 wherein the anti-glare characteristic is in a pattern at a surface of the first layer.

33. The roof laminate of claim 31 wherein the anti-glare characteristic is provided by a low crystallinity polymer.

34. The roof laminate of claim 31 wherein the anti-glare characteristic is provided by an amorphous poly-alpha olefin, a vinyl acetate/ethylene, ethylene-vinyl acetate, acrylic, or silicone.

35. The roof laminate of claim 31 wherein the anti-slip characteristic is provided by one or more of a block copolymer, an amorphous poly-alpha olefin, a vinyl acetate/ethylene, and an ethylene-vinyl acetate (EVA).

36. The roof laminate of claim 17 wherein the raised areas and recessed areas produce thickness differences in the first layer, the raised areas being relatively thicker than the recessed areas.

37. The roof laminate of claim 16 wherein the first layer is configured to provide UV protection and the anti-glare characteristic to the roof laminate.

38. The roof laminate of claim 37 wherein UV protection is provided by one or more of a hindered phenol, a thiosynergist, a hydroxylamine, a phosphate, an alpha-tocopherol benzotriazole, a hydroxybenzoate, a benzophenone, a triazine, and a hindered amine.

\* \* \* \* \*